United States Patent
Balakrishnan et al.

(10) Patent No.: US 10,555,256 B2
(45) Date of Patent: Feb. 4, 2020

(54) RE-SAMPLING WITH REDUCED POWER CONSUMPTION AND COMPLEXITY

(71) Applicant: TEXAS INSTRUMENTS INCORPORATED, Dallas, TX (US)

(72) Inventors: Jaiganesh Balakrishnan, Bangalore (IN); Jawaharlal Tangudu, Bangalore (IN); Sreenath Potty Narayanan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 243 days.

(21) Appl. No.: 15/259,703

(22) Filed: Sep. 8, 2016

(65) Prior Publication Data
US 2017/0070952 A1 Mar. 9, 2017

(30) Foreign Application Priority Data

Sep. 8, 2015 (IN) .............................. 4755/CHE/2015

(51) Int. Cl.
*H04W 52/02* (2009.01)
(52) U.S. Cl.
CPC ......... *H04W 52/0203* (2013.01); *Y02D 70/00* (2018.01)
(58) Field of Classification Search
CPC .................... H04W 52/0203; H04L 43/028
USPC ....................................................... 370/241
See application file for complete search history.

(56) References Cited

U.S. PATENT DOCUMENTS

| 6,295,011 B1* | 9/2001 | Brown ...................... G06T 1/20 341/57 |
| 9,094,033 B1* | 7/2015 | Lye .......................... H03M 1/68 |
| 2002/0116427 A1* | 8/2002 | Jiang ................... H03H 17/0275 708/313 |
| 2002/0136316 A1* | 9/2002 | Winkler ................. G08C 15/00 375/259 |
| 2003/0058787 A1* | 3/2003 | Vandenameele-Lepla ................... H04L 25/0202 370/206 |
| 2006/0227919 A1* | 10/2006 | Wolaver ............... H03D 13/003 375/375 |
| 2007/0188371 A1* | 8/2007 | Callison .................. G01S 7/295 342/25 A |

(Continued)

*Primary Examiner* — Sai Ming Chan
(74) *Attorney, Agent, or Firm* — Ebby Abraham; Charles A. Brill; Frank D. Cimino

(57) ABSTRACT

A re-sampler comprises a first CSD multiplier configured to receive input samples, a first accumulator coupled to the first CSD multiplier and configured to form a first MAC unit with the first CSD multiplier, a second CSD multiplier configured to receive the input samples, and a second accumulator coupled to the second CSD multiplier and configured to form a second MAC unit with the second CSD multiplier, wherein the re-sampler is configured to generate output samples based on the input samples. A method comprises receiving, by a first CSD multiplier, input samples, receiving, by a second CSD multiplier, the input samples, generating coefficients, scaling, using the first CSD multiplier and the second CSD multiplier, the input samples with coefficient vectors associated with the coefficients to form coefficient vector scaled input samples, and generating output samples based on the coefficient vector scaled input samples. The CSD multipliers may be MC-CSD multipliers.

24 Claims, 9 Drawing Sheets

(56) References Cited

U.S. PATENT DOCUMENTS

| | | | |
|---|---|---|---|
| 2007/0263754 A1* | 11/2007 | Currivan | H04B 1/0003 375/349 |
| 2010/0158178 A1* | 6/2010 | Sobchak | H03H 17/0685 375/355 |
| 2013/0034142 A1* | 2/2013 | Kitta | H04L 7/0029 375/229 |
| 2017/0063575 A1 | 3/2017 | Balakrishnan et al. | |

* cited by examiner

| INPUT INDEX | m-7 | m-6 | m-5 | m-4 | m-3 | m-2 | m-1 | m | m+1 | m+2 | m+3 | m+4 | m+5 | m+6 | m+7 | m+8 | m+9 | |
|---|---|---|---|---|---|---|---|---|---|---|---|---|---|---|---|---|---|---|
| MULTIPLIER 1 | 56 | 57 | 58 | 59 | 60 | 61 | 62 | 54 | 55 | 56 | 57 | 58 | 59 | 60 | 61 | 62 | 54 | |
| MULTIPLIER 2 | | 48 | 49 | 50 | 51 | 52 | 53 | 45 | 46 | 47 | 48 | 49 | 50 | 51 | 52 | 53 | 45 | |
| MULTIPLIER 3 | | | 40 | 41 | 42 | 43 | 44 | 36 | 37 | 38 | 39 | 40 | 41 | 42 | 43 | 44 | 36 | |
| MULTIPLIER 4 | | | | 32 | 33 | 34 | 35 | 27 | 28 | 29 | 30 | 31 | 32 | 33 | 34 | 35 | 27 | |
| MULTIPLIER 5 | | | | | 24 | 25 | 26 | 18 | 19 | 20 | 21 | 22 | 23 | 24 | 25 | 26 | 18 | |
| MULTIPLIER 6 | | | | | | 16 | 17 | 9 | 10 | 11 | 12 | 13 | 14 | 15 | 16 | 17 | 9 | |
| MULTIPLIER 7 | | | | | | | 8 | 0 | 1 | 2 | 3 | 4 | 5 | 6 | 7 | 8 | 0 | |
| OUTPUT INDEX | | | | | | | | n | n+1 | n+2 | n+3 | n+4 | n+5 | n+6 | n+7 | n+8 | | |

| | SET 0 | SET 1 | SET 2 | SET 3 | SET 4 | SET 5 | SET 6 | SET 7 | SET 8 |
|---|---|---|---|---|---|---|---|---|---|
| MULTIPLIER 1 | 54 | 55 | 56 | 57 | 58 | 59 | 60 | 61 | 62 |
| MULTIPLIER 2 | 45 | 46 | 47 | 48 | 49 | 50 | 51 | 52 | 53 |
| MULTIPLIER 3 | 36 | 37 | 38 | 39 | 40 | 41 | 42 | 43 | 44 |
| MULTIPLIER 4 | 27 | 28 | 29 | 30 | 31 | 32 | 33 | 34 | 35 |
| MULTIPLIER 5 | 18 | 19 | 20 | 21 | 22 | 23 | 24 | 25 | 26 |
| MULTIPLIER 6 | 9 | 10 | 11 | 12 | 13 | 14 | 15 | 16 | 17 |
| MULTIPLIER 7 | 0 | 1 | 2 | 3 | 4 | 5 | 6 | 7 | 8 |

| | SET 0 | SET 1 | SET 2 | SET 3 | SET 4 | SET 5 | SET 6 | SET 7 | SET 8 |
|---|---|---|---|---|---|---|---|---|---|
| MULTIPLIER 1 | 0 | 0 | 41 | 48 | 67 | 78 | 92 | 59 | 24 |
| MULTIPLIER 2 | -49 | -159 | -458 | -672 | -965 | -1246 | -1542 | -1637 | -1699 |
| MULTIPLIER 3 | -1546 | -1152 | -192 | 851 | 2319 | 4048 | 6101 | 8050 | 10239 |
| MULTIPLIER 4 | 12282 | 14090 | 15211 | 16144 | 16409 | 16144 | 15211 | 14090 | 12282 |
| MULTIPLIER 5 | 10239 | 8050 | 6101 | 4048 | 2319 | 851 | -192 | -1152 | -1546 |
| MULTIPLIER 6 | -1699 | -1637 | -1542 | -1246 | -965 | -672 | -458 | -159 | -49 |
| MULTIPLIER 7 | 24 | 59 | 92 | 78 | 67 | 48 | 41 | 0 | 0 |

FIG. 6

| INPUT INDEX | m | m+1 | m+2 | m+3 | m+4 | m+5 | m+6 | m+7 | m+8 | m+9 | m+10 | m+2 | |
|---|---|---|---|---|---|---|---|---|---|---|---|---|---|
| COEFFICIENT SET | SET 0 | SET 1 | SET 2 | SET 3 | SET 4 | SET 5 | SET 6 | SET 7 | SET 8 | SET 0 | SET 1 | SET 2 | ○○○ |
| MULTIPLIER 1 | 54 | 55 | 56 | 57 | 58 | 59 | 60 | 61 | 62 | 54 | 55 | 56 | ○○○ |
| MULTIPLIER 2 | 45 | 46 | 47 | 48 | 49 | 50 | 51 | 52 | 53 | 45 | 46 | 47 | ○○○ |
| MULTIPLIER 3 | 36 | 37 | 38 | 39 | 40 | 41 | 42 | 43 | 44 | 36 | 37 | 38 | ○○○ |
| MULTIPLIER 4 | 27 | 28 | 29 | 30 | 31 | 32 | 33 | 34 | 35 | 27 | 28 | 29 | ○○○ |
| MULTIPLIER 5 | 18 | 19 | 20 | 21 | 22 | 23 | 24 | 25 | 26 | 18 | 19 | 20 | ○○○ |
| MULTIPLIER 6 | 9 | 10 | 11 | 12 | 13 | 14 | 15 | 16 | 17 | 9 | 10 | 11 | ○○○ |
| MULTIPLIER 7 | 0 | 1 | 2 | 3 | 4 | 5 | 6 | 7 | 8 | 0 | 1 | 2 | ○○○ |
| x(m+2k) | SET 0 | SET 2 | SET 4 | SET 6 | SET 8 | SET 1 | SET 3 | SET 5 | SET 7 | | | | |
| x(m+2k+1) | SET 1 | SET 3 | SET 5 | SET 7 | SET 0 | SET 2 | SET 4 | SET 6 | SET 8 | | | | |

RE-SAMPLING WITH REDUCED POWER CONSUMPTION AND COMPLEXITY

CROSS-REFERENCE TO RELATED APPLICATIONS

This application claims priority to Indian provisional patent application Number 4755/CHE/2015 filed on Sep. 8, 2015 by Texas Instruments and titled "Low Power Parallelized Architecture For M-By-N Resampler," which is incorporated by reference.

BACKGROUND

SRC is the process of changing a sampling rate of a discrete signal to obtain a new discrete representation of the underlying continuous signal. A typical SRC implements a rational re-sampling ratio M/N. M is a first sample rate, for instance an up-sampling rate, and N is a second sample rate, for instance a down-sampling rate. Up-sampling, or interpolation, increases a sampling rate of a signal. Down-sampling, or decimation, decreases the sampling rate of the signal.

Signal chain systems such as communications transceivers and automotive radar receivers use M/N SRC. In those applications, high-performance, RF-sampling ADCs with integrated digital front-ends implement the M/N SRC. In mobile network base stations, the front-ends may change the ADC sampling frequency in a range of, for instance, 2 GHz to 3 GHz depending on the center frequencies of signal bands. That technique prevents second and third harmonic spurs from folding back in to the signal bands. However, interface rates for decimated input signals may be at fixed sample rates, for instance 245.76 MHz, which may necessitate resampling factors of 8/9, 4/5, and 2/3.

SUMMARY

In one embodiment, the disclosure includes a re-sampler comprises a first CSD multiplier configured to receive input samples, a first accumulator coupled to the first CSD multiplier and configured to form a first MAC unit with the first CSD multiplier, a second CSD multiplier configured to receive the input samples, and a second accumulator coupled to the second CSD multiplier and configured to form a second MAC unit with the second CSD multiplier, wherein the re-sampler is configured to generate output samples based on the input samples.

In another embodiment, the disclosure includes a re-sampler comprises a first MC-CSD multiplier configured to receive input samples, a second MC-CSD multiplier configured to receive the input samples, and a commutator coupled to the first MC-CSD multiplier and the second MC-CSD multiplier, wherein the re-sampler is configured to generate output samples based on the input samples.

In another embodiment, the disclosure includes a re-sampler comprises an input commutator configured to receive input samples, a first MC-CSD multiplier coupled to the input commutator, a first intermediate commutator coupled to the first MC-CSD multiplier, a second MC-CSD multiplier coupled to the input commutator, a second intermediate commutator coupled to the second MC-CSD multiplier, and an output commutator coupled to the first intermediate commutator and the second intermediate commutator and configured to generate output samples based on the input samples.

In yet another embodiment, the disclosure includes a method implemented in a re-sampler, the method comprises receiving, by a first CSD multiplier, input samples, receiving, by a second CSD multiplier, the input samples, generating coefficients, scaling, using the first CSD multiplier and the second CSD multiplier, the input samples with coefficient vectors associated with the coefficients to form coefficient vector scaled input samples, and generating output samples based on the coefficient vector scaled input samples.

BRIEF DESCRIPTION OF THE DRAWINGS

For a detailed description of various examples, reference will now be made to the accompanying drawings.

FIG. 3 is a table of coefficient indices for the multipliers in the re-sampler in FIG. 2.

FIG. 4 is a simplified table of coefficient indices for the multipliers in the re-sampler in FIG. 2.

FIG. 6 is a simplified table of coefficients for the CSD multipliers in the re-sampler in FIG. 2.

FIG. 8 is a table of coefficient indices for a parallelized re-sampler.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The following abbreviations, acronyms, and initialisms apply:

ADC: analog-to-digital conversion, analog-to-digital converter

CSD: canonical-signed-digit

DDC: digital down-converter

GHz: gigahertz

I: in-phase

LUT: look-up table

MAC: multiplier-accumulator

MC-CSD: multi-coefficient CSD

MHz: megahertz

Q: quadrature

RF: radio frequency

SRC: sample-rate conversion.

Figure 1:
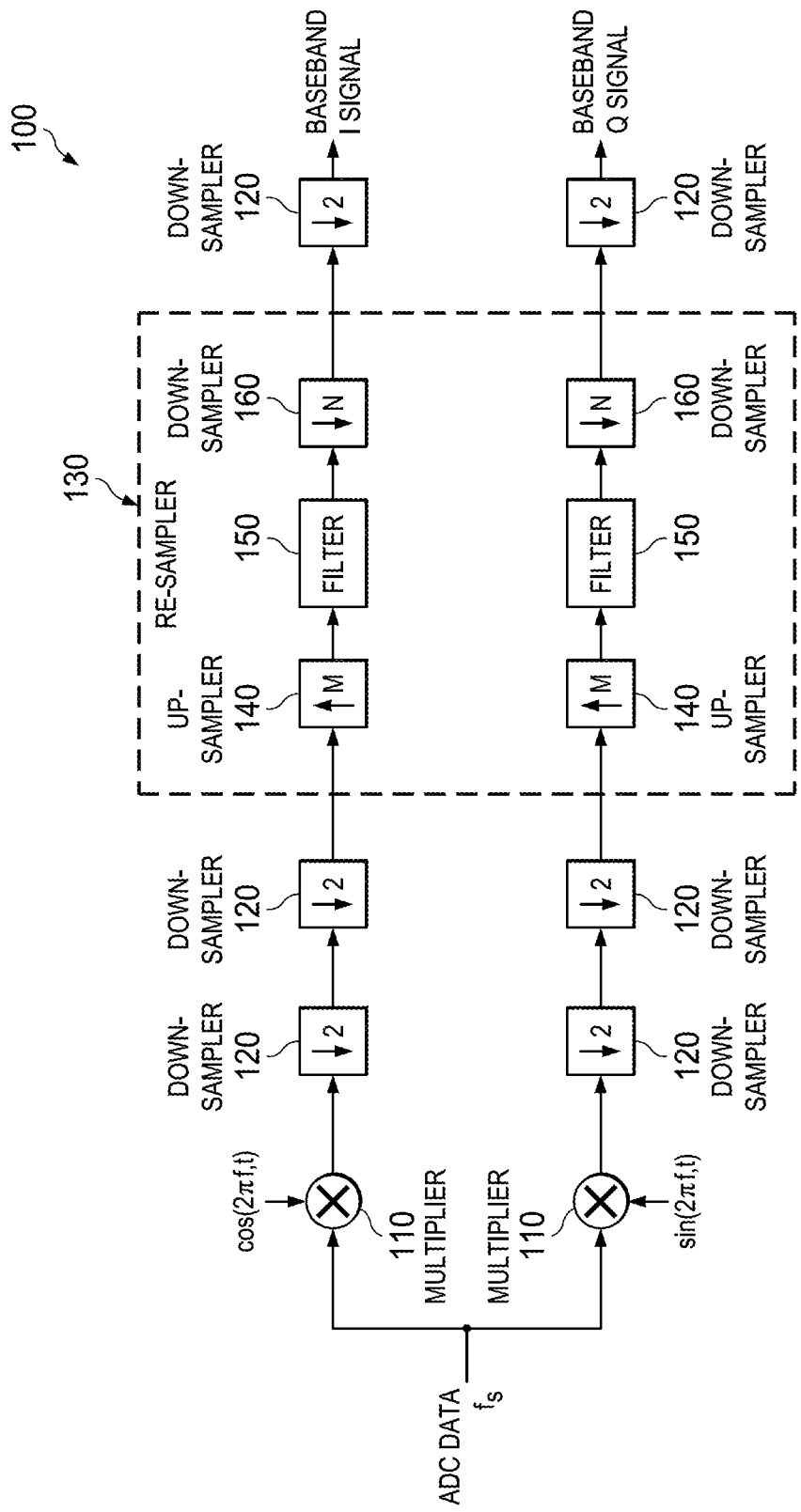
FIG. 1 is a schematic diagram of a DDC.

FIG. 1 is a schematic diagram of a DDC 100. The DDC 100 is described in U.S. patent application Ser. No. 15/246, 248 filed on Aug. 24, 2016 by Jaiganesh Balakrishnan, et al., and titled "Analog-Digital Compatible Re-Sampling" ("Balakrishnan"), which is incorporated by reference. The DDC 100 comprises multipliers 110, down-samplers 120, and a re-sampler 130. The down-samplers 120 may have a down-sampling rate of 2. The DDC 100 comprises a top branch for a baseband I signal and a bottom branch for a baseband Q signal. The re-sampler 130 comprises up-samplers 140, filters 150, and down-samplers 160. The re-sampler 130 may be referred to as an M/N re-sampler because it comprises the up-samplers 140, which may have an up-sampling rate of M, and comprises the down-samplers 160, which may have a down-sampling rate of N, which combine to form an M/N resampling ratio.

If the re-sampler 130 receives an input signal x(m) and if the sequence $\{h_0, h_1, \ldots, h_{L-1}\}$ represents the coefficients of the filters 150 with L taps, then the filters 150 compute up-sampled and interpolated signals as follows:

$$u(Mm+l) = \sum_{k=0}^{\lfloor (L-1)/M \rfloor} x(m-k) * h_{Mk+l}, \forall l = 0, 1, \ldots, M-1 \quad (2)$$

where u is an output signal; M is the up-sampling rate of the up-samplers 140; m is an integer sampling index of the input signal x(m); l is an integer that varies from 0 to M−1 and represents the sampling index of the interpolated and filtered output signal u(Mm+l); $\lfloor \ \rfloor$ represents a floor operation, which computes a nearest integer that is less than its operand; L is a positive integer number of taps, or coefficients, of the filters 150; k is an integer that varies from 0 to $\lfloor (L-1)/M \rfloor$, represents a delay in the sampling index of x(m) to obtain x(m−k), and is an index of the filter coefficient $h_{Mk+l}$; and h is a tap coefficient. However, because the down-samplers 160 follow the filters 150, it may be sufficient to compute only every $N^{th}$ sample of u(Mm+l) in order to generate the output sample y(n). To compute one output sample, up to $P = \lceil L/M \rceil$ multiplication and accumulation operations may be used. The operations may have different phases l of the filter coefficients. The operator $\lceil \ \rceil$ represents a ceiling operation, which computes a nearest integer that is greater than its operand.

Figure 2:
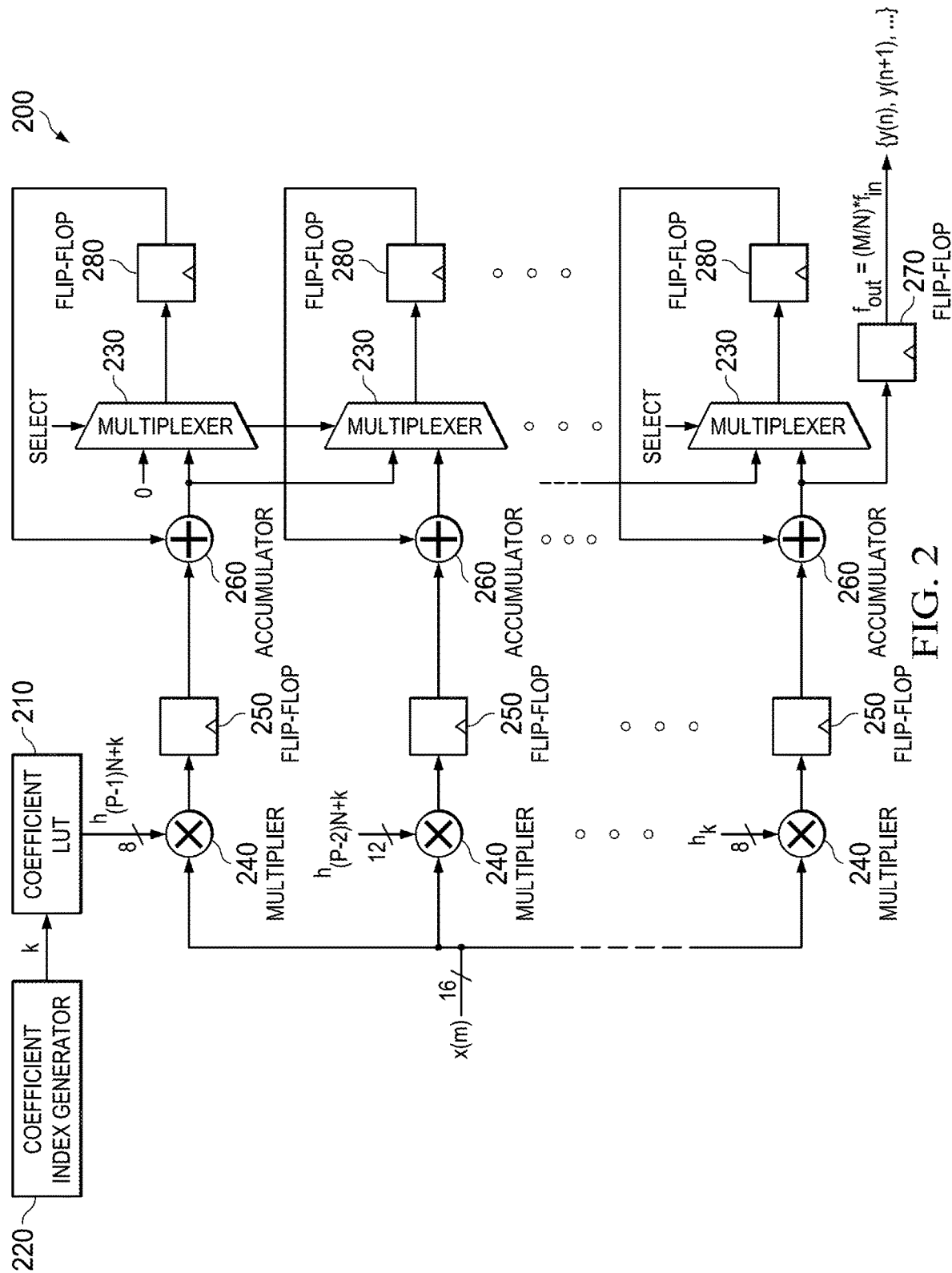
FIG. 2 is a schematic diagram of a re-sampler.

FIG. 2 is a schematic diagram of a re-sampler 200. The re-sampler 200 is described in Balakrishnan. The re-sampler 200 may implement the re-sampler 130 and may be referred to as a ripple-down MAC re-sampler. The re-sampler 200 comprises a coefficient LUT 210, a coefficient index generator 220, P multiplexers 230, multipliers 240, flip-flops 250, accumulators 260, a flip-flop 270, and flip-flops 280. The re-sampler 200 also comprises P instances of N:1 multiplexers to select the coefficients for the multipliers 240. P is a positive integer, and N is a positive integer down-sampling rate. The accumulators 260 may instead be referred to as adders, and a combination of the accumulators 260 and the flip-flops 280 may be referred to as accumulators. If the flip-flops 250, 270, 280 store multiple bits, then they may be referred to as registers.

In operation, the multiplexers 230, which are 2:1 multiplexers, select outputs from either their corresponding accumulator 260 or the preceding accumulator 260. For instance, the second multiplexer 230 selects outputs from either the second accumulator 260 or the first accumulator 260. That allows the sum of partial products, or the sum of intermediate outputs of the accumulators 260, to be "rippled down" during every output sample index. However, when M/N=8/9, the re-sampler 200 does not generate output samples y(n) for every ninth input sample index, for instance for the output sample corresponding to the input sample x(m+8). The last accumulator 260 provides the final output sample to the flip-flop 270. The flip-flop 270 provides samples at the equivalent output clock rate $f_{out}$. The flip-flops 250 are optional and aid in timing closure of the digital logic at high clocking rates.

FIG. 3 is a table 300 of coefficient indices for the multipliers 240 in the re-sampler 200 in FIG. 2. The coefficient indices are k for each $h_k$. The table 300 is described in Balakrishnan. The table 300 assumes L=63 filter coefficients and a re-sampling ratio M/N=8/9. Thus, $P = \lceil L/N \rceil = \lceil 63/9 \rceil = \lceil 7 \rceil = 7$, so there are 7 multipliers 240 as denoted by multiplier 1 to multiplier 7. The partial products that correspond to each of the output samples have the same hatching scheme. For instance, the partial products 61 for multiplier 1, 53 and 45 for multiplier 2, 37 for multiplier 3, 29 for multiplier 4, 21 for multiplier 5, 13 for multiplier 6, and 5 for multiplier 7 correspond to output sample y(n+5).

When the re-sampler 200 does not generate a final output sample, for instance for the output sample corresponding to the $N^{th}$ input sample, the select signal of the multiplexers 230 is 1, which causes the re-sampler 200 to retain the sum of partial products in their respective streams. For all other input samples, the select signal for the multiplexers 230 is 0, which causes the re-sampler 200 to ripple down the sum of partial products. One of the inputs to the first multiplexer 230 is 0, which ensures that the output of the first flip-flop 280 is reset when the first partial product corresponding to a new output sample needs to be computed. The multipliers 240 cycle through a different set of only N=9 coefficients, and the entire coefficient selection and multiplexer selection repeats after N input sample instances. In other words, each multiplier 240 uses a different set of N coefficients, and all of the sets of N coefficients make up a total of L coefficients. The index k, which the multiplexers use to select the coefficients $\{h_{(P-1)N+k}, h_{(P-2)N+k}, \ldots, h_k\}$ for the multipliers 540, periodically takes values from (0, 1, . . . , N−1).

FIG. 4 is a simplified table 400 of coefficient indices for the multipliers 230 in the re-sampler 200 in FIG. 2. The table 400 is similar to the table 300 in FIG. 3. However, the table 400 is simplified to show the maximum number, N=9, of sets of coefficients that the multipliers 230 need to handle. The column for set 0 in the table 400 corresponds to the column for x(m) in the table 300 in FIG. 3, the column for set 1 in the table 400 corresponds to the column for x(m+1) in the table 300, and so on.

A dual-channel RF-sampling ADC may support two DDC chains per channel and two streams per DDC chain, where a first stream is an I stream and a second stream is a Q stream. That ADC architecture implements eight M/N re-samplers such as the re-sampler 200. Because the ADC implements so many re-samplers, there is a need to reduce the power consumption of those re-samplers.

In addition, the re-sampler 130 in FIG. 1 may need to operate at a sampling rate of approximately 750 MHz. Current semiconductor technology may not support that sampling rate. As a result, the re-sampler 130 may need to be parallelized to receive two input samples for each clock cycle and therefore operate at $f_{in}/2$ and may need to replicate its logic to provide two output samples for every clock cycle.

Disclosed herein are embodiments for re-samplers with reduced power consumption and complexity. In a first embodiment, a re-sampler comprises MC-CSD multipliers, which replace standard multipliers. The MC-CSD multipliers replace multiplication operations with shift, addition, and subtraction operations for a set of fixed coefficients. Though the first embodiment may implement additional adders, unused adders at each instant may be clock gated and data gated. In a second embodiment, a re-sampler comprises a commutator, which provides for a halving of a circuit area used by MC-CSD multipliers. In a third embodiment, a parallelized re-sampler is described. The parallelized re-sampler may reduce the circuit area by, for instance, an additional 40%. Each of the embodiments may reduce power consumption compared to other re-samplers, including other ripple-down MAC re-samplers, by, for instance, 40%.

Figure 5:
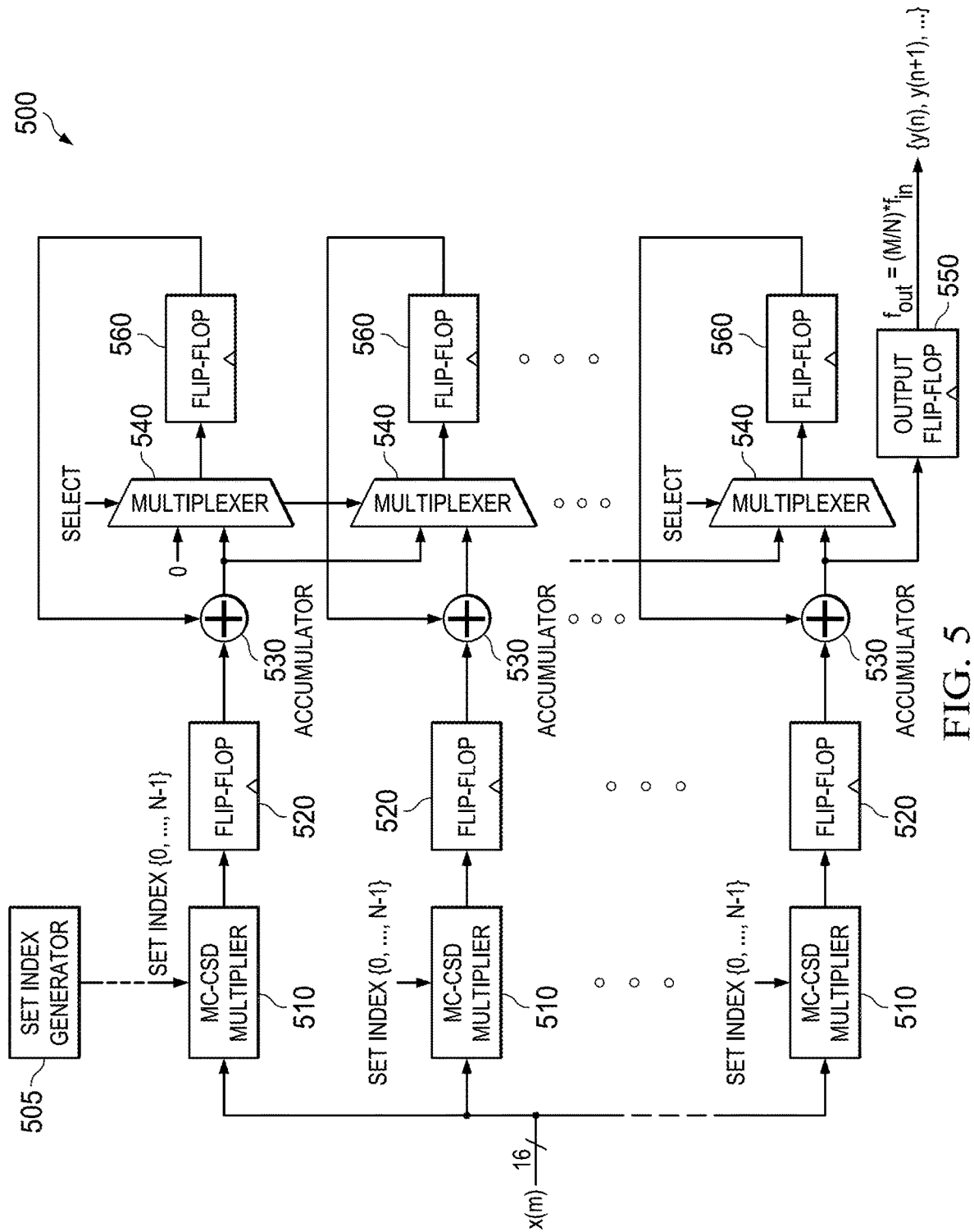
FIG. 5 is a schematic diagram of a re-sampler according to an embodiment of the disclosure.

FIG. 5 is a schematic diagram of a re-sampler 500 according to an embodiment of the disclosure. The re-sampler 500 may implement the re-sampler 130 in FIG. 1 and may be referred to as a ripple-down CSD re-sampler. The re-sampler 500 comprises a set index generator 505, P CSD multipliers 510, P flip-flops 520, P accumulators 530, P multiplexers 540, an output flip-flop 550, and P flip-flops 560. P is a positive integer. The CSD multipliers 510 may be referred to as vector CSD multipliers and may be MC-CSD multipliers. The flip-flops 520 are optional and aid in timing closure of the digital logic at high clocking rates.

The re-sampler 500 in FIG. 5 is similar to the re-sampler 200 in FIG. 2. However, the re-sampler 500 replaces the multiplication operations of the multipliers 240 in FIG. 2 with shift, addition, and subtraction operations of the MC-CSD multipliers 510. Because the MC-CSD multipliers 510 handle 9 sets of coefficients, the implementation of the MC-CSD multipliers 510 may not be as spatially efficient as other multipliers such as the non-MC-CSD multipliers 240 in FIG. 2, which may be referred to as generic or common multipliers. For instance, if each coefficient weighting uses approximately 3 adders, then 9 sets of coefficients may require 27 adders, which may require more circuit area than generic multipliers. However, because only the adders corresponding to one set of coefficients are active at each instant, the remainder of the logic may be clock and date gated. Clock gating refers to disabling portions of circuits so that flip-flops in the disabled portions do not have to switch states, which consumes power. Data gating refers to providing a zero, or fixed, input so that the combinatorial logic does not toggle. Toggling consumes power, so a reduction in toggling reduces power consumption.

Because the same input signal x(m) enters all of the MC-CSD multipliers 510, x(m) may be treated as a vector MC-CSD multiplier that generates P outputs corresponding to $x(m)*[h_{(P-1)N+k}, \ldots, h_{N+k}, h_k]^T$ for $k=0, 1, \ldots, N-1$ over a clock cycle. The set index generator 505 generates the coefficient indices k. The N sets of sub-filter coefficients in the table 300 in FIG. 3 are represented by the P-length column vectors $h^0, h^1, \ldots, h^{N-1}$, where $h^k = [h_{(P-1)N+k}, \ldots, h_{N+k}, h_k]$ and its $I^{th}$ element is given as $h^k(I)=h_{(P-I)N+k}$. Typically, the L-tap filter impulse response h would be a symmetric filter so that $h_k=h_{L-1-k}$. However, none of the sub-filters $h^k$ would be symmetric except for the middle set $h^{(N-1)/2}$ for an odd N.

FIG. 6 is a simplified table 600 of coefficients for the MC-CSD multipliers 510 in the re-sampler 500 in FIG. 5. In the table 600, sub-filters $h^k$ and $h^{N-k-1}$ have the same coefficients, but in a reverse order, namely $h^k(I)=h^{N-k-1}(P-I)$. For instance, the sub-filter $h^0$ has a coefficient value of 0 for a first multiplier, the sub-filter $h^8$ has the same coefficient value of 0 for a seventh multiplier, the sub-filter $h^0$ has a coefficient value of −49 for a second multiplier, the sub-filter $h^8$ has the same coefficient value of −49 for a sixth multiplier, and so on. Similarly, the sub-filter $h^7$ has reversed values of the sub-filter $h^1$, the sub-filter $h^6$ has reversed values of the sub-filter $h^2$, and the sub-filter $h^5$ has reversed values of the sub-filter $h^3$.

Figure 7:
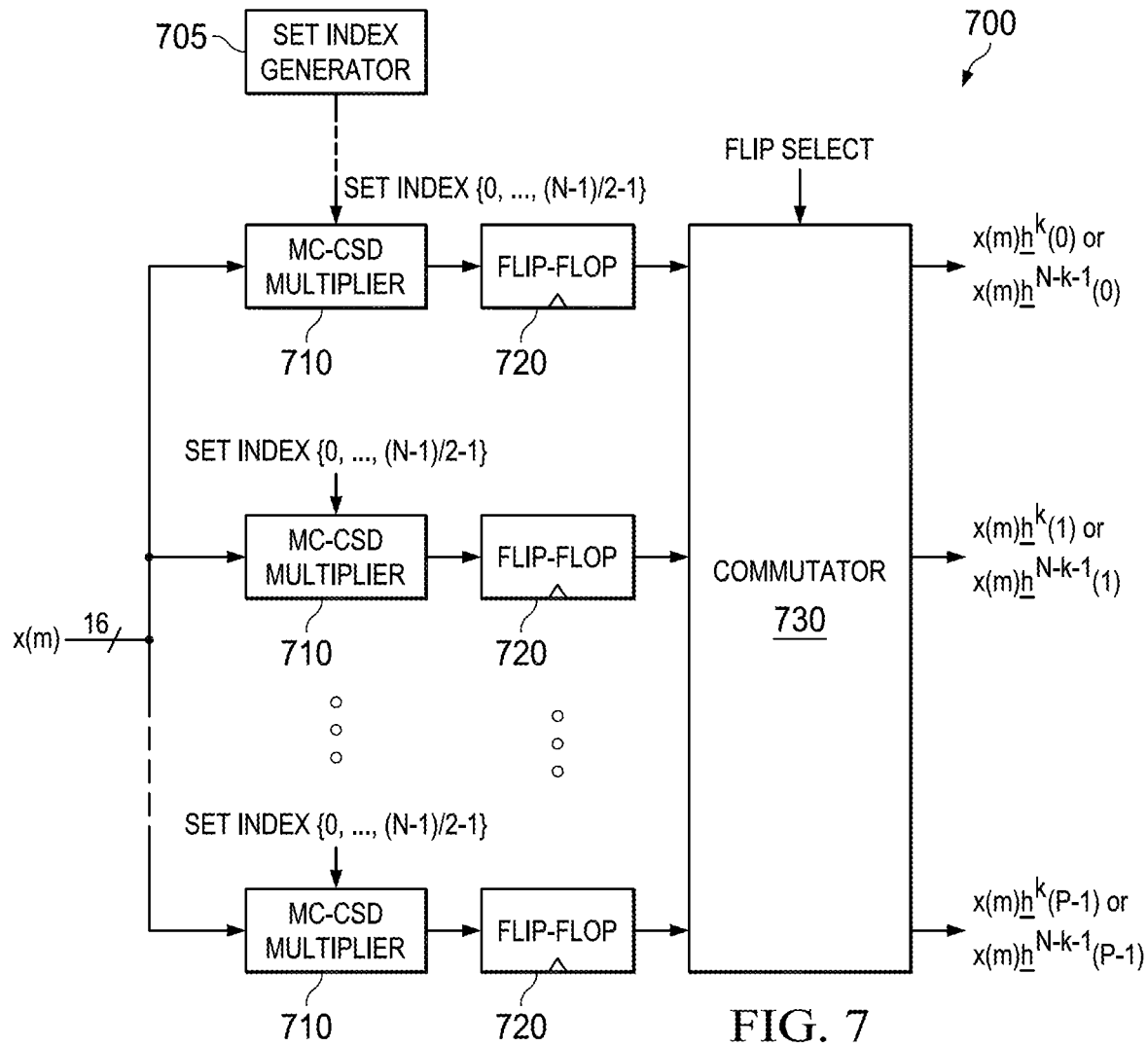
FIG. 7 is a schematic diagram of a re-sampler according to another embodiment of the disclosure.

FIG. 7 is a schematic diagram of a re-sampler 700 according to another embodiment of the disclosure. The re-sampler 700 may implement the re-sampler 130 in FIG. 1 and may also be referred to as a ripple-down CSD re-sampler. The re-sampler 700 comprises a set index generator 705, P MC-CSD multipliers 710, P flip-flops 720, and a commutator 730. P is a positive integer. The set index generator 705 generates the coefficient indices k. The commutator 730 may comprise $\lfloor P/2 \rfloor$ two-input commutators that either flip or do not flip the set of P inputs. A two-input commutator is a cross-bar switch. When the flip select signal is 0, then the commutator passes $(x_1, x_2)$ from its inputs to its outputs. When the flip select signal is 1, then the commutator flips $(x_1, x_2)$ to $(x_2, x_1)$ and passes $(x_2, x_1)$ from its inputs to its outputs.

The re-sampler 700 exploits the commonality of coefficients in the table 600 in FIG. 6. Specifically, the re-sampler 700 uses the MC-CSD multipliers 710 to generate $h^k$, but uses the commutator 730 to generate $h^{N-k+1}$ by employing $h^k$ and flipping the inputs of the commutator 730. As shown, the MC-CSD multipliers 710 implement only $\lceil N/2 \rceil$ coefficients instead of N coefficients. The commutator 730 selectively flips or does not flip outputs from the flip-flops 720 depending on which sub-filter is selected.

For instance, when sub-filter $\underline{h}^k$ for $k<\lfloor N/2 \rfloor$ is selected the output vector is not flipped, and when sub-filter $\underline{h}^k$ for $k\geq\lfloor N/2 \rfloor$ is selected the output vector is flipped. That results in nearly halving a circuit area used by the MC-CSD multipliers 710. Alternatively, the re-sampler 700 may implement only sub-filter coefficient sets $\underline{h}^k$, where $k=\lfloor N/2 \rfloor, \lfloor N/2 \rfloor+1, \ldots, N-1$, with an appropriately modified flip select signal.

As shown, for the re-samplers 200, 500, 700, the input components receive the same input signal x(m). Some re-samplers, for instance one of the re-samplers described in Balakrishnan, comprise input components that receive different input signals, for instance x(m−P−1), ..., x(m). For such a re-sampler to exploit the commonality of coefficients, the re-sampler may comprise an input commutator to selectively flip the input signals x(m−k) and x(m−P−1+k).

MAC-based re-samplers such as the re-samplers 200, 500, 700 may be parallelized, for instance by a factor of 2. Such a parallelized re-sampler processes two new input samples x(m) and x(m+1) in the same clock cycle. Specifically, the input samples x(m) and x(m+1) are multiplied by two different sets of sub-filter coefficients in the same clock cycle. To implement the parallelization, the re-sampler doubles the logic and thus the components to implement the logic. The doubling of the components doubles the circuit area used.

FIG. 8 is a table 800 of coefficient indices for a parallelized re-sampler. The re-sampler is an M/N=8/9 re-sampler. In the table 800, the input samples x(m+2 k) may be referred to as even input samples, and the inputs samples x(m+2 k+1) may be referred to as odd input samples. Processing windows refer to groups of two input indices. For instance, the input indices m and m+1 make up a first processing window, the input indices m+2 and m+3 make up a second processing window, and so on. In the first processing window, the input sample x(m) is scaled by coefficient set $\underline{h}^0$, while the input sample x(m+1) is scaled by coefficient set $\underline{h}^1$. In the second processing window, the input x(m+2) is scaled by coefficient set $\underline{h}^2$, while the input sample x(m+3) is scaled by coefficient set $\underline{h}^3$, and so on. In the first four processing windows, the even input samples use coefficient sets $h^0$, $h^2$, . . . , and the odd input samples use coefficient sets $h^1$, $h^3$, . . . . In the next processing window, the even input sample uses coefficient set $h^8$, and the odd input sample uses coefficient set $h^0$. In the next four processing windows, the even input samples use coefficient sets $h^1$, $h^3$, . . . , and the odd input samples use coefficient sets $h^2$, $h^4$, . . . .

Figure 9:
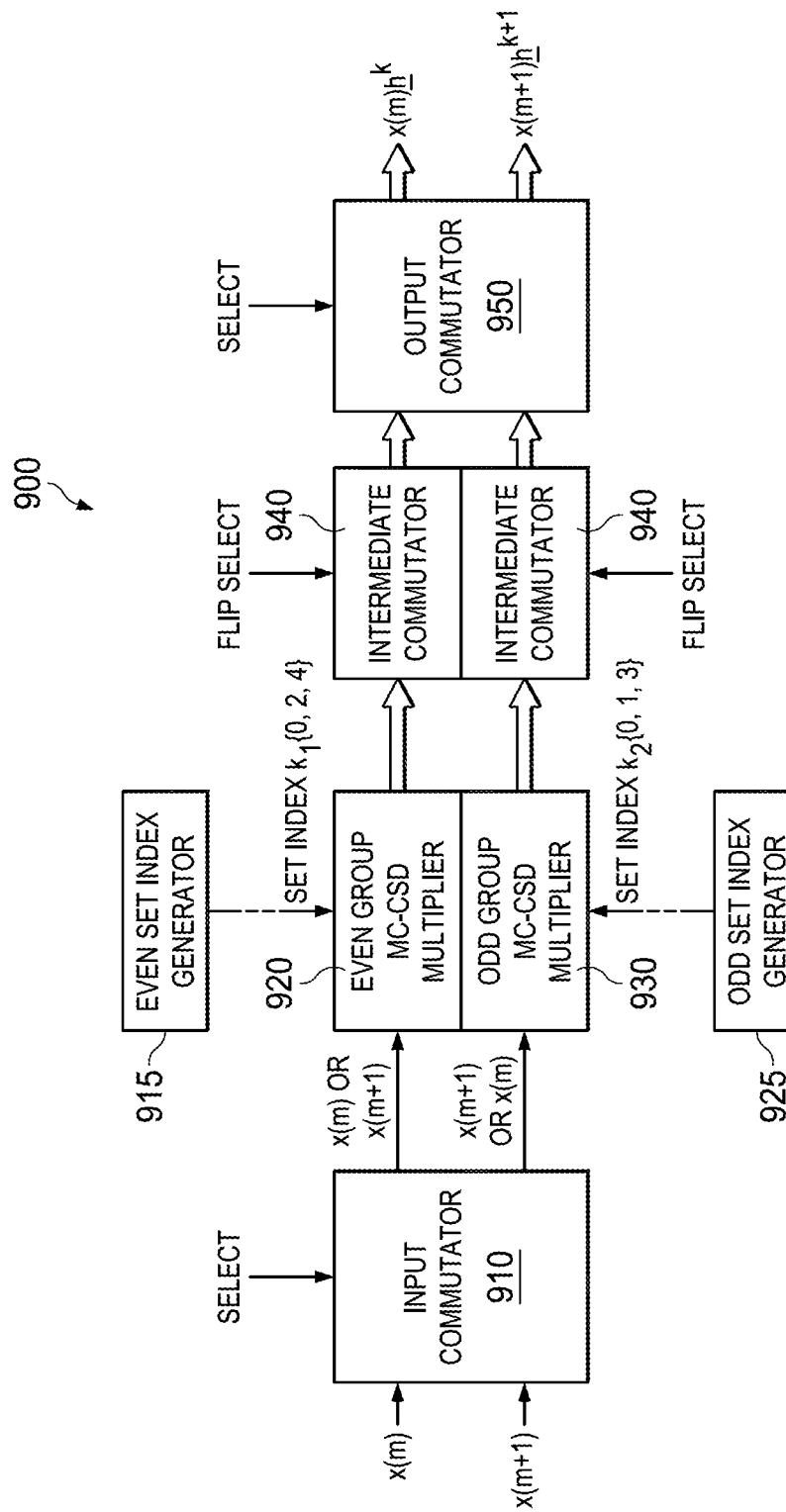
FIG. 9 is a simplified schematic diagram of a re-sampler according to yet another embodiment of the disclosure.

FIG. 9 is a simplified schematic diagram of a re-sampler 900 according to yet another embodiment of the disclosure. The re-sampler 900 may implement the re-sampler 130 in FIG. 1 and may also be referred to as a ripple-down CSD re-sampler. The re-sampler 900 comprises an input commutator 910, an even set index generator 915, an even group MC-CSD multiplier 920, an odd set index generator 925, an odd group MC-CSD multiplier 930, intermediate commutators 940, and an output commutator 950. The even group MC-CSD multiplier 920 and the odd group MC-CSD multiplier 930 may be referred to as vector CSD multipliers. The intermediate commutators 940 may have independent flip select signals.

The re-sampler 900 exploits the properties described above with respect to the table 800 in FIG. 8. Specifically, the re-sampler 900 splits the MC-CSD multipliers into the even group MC-CSD multiplier 920 and the odd group MC-CSD multiplier 930. The even group CSD multiplier 920 supports the even sub-filters ($\underline{h}^0$, $\underline{h}^2$, $\underline{h}^4$), and the odd group CSD multiplier 930 supports the odd sub-filters ($\underline{h}^0$, $\underline{h}^1$, $\underline{h}^3$). The coefficient set $\underline{h}^0$ is common to both groups. The input commutator 910 passes even input samples and odd input samples to the even group MC-CSD multiplier 920 and the odd group MC-CSD multiplier 930 as they are, or the input commutator 910 flips the even input samples and the odd input samples. The output commutator 950 similarly processes the vector outputs of the even group MC-CSD multiplier 920 and the odd group MC-CSD multiplier 930.

Both the even group MC-CSD multiplier 920 and the odd group MC-CSD multiplier 930 support the coefficient set $h^0$ in order to handle the transition between processing windows. If N is even, then the duplication of a common coefficient set in the even CSD multiplier 920 and the odd CSD multiplier 930 may not be necessary. The commutator select signal determines whether the commutator 910 passes x(m) or x(m+1) to either the even CSD multiplier 920 or the odd CSD multiplier 930. The same select signal passes to the output commutator 950.

The select signal of the input commutator 910 is zero when the even group MC-CSD multiplier 920 and the odd group MC-CSD multiplier 930 are to scale the input samples x(m+2 k) and x(m+2 k+1), respectively. Alternatively, The select signal of the commutator 910 is one when the odd group MC-CSD multiplier 930 and the even group MC-CSD multiplier 920 are to scale the inputs x(m+2 k) and x(m+2 k+1), respectively. The set index generators 915, 925 indicate which of the sub-filter indices $k_1$, $k_2$ are to be selected for the even group and the odd group. For any generic M/N, the even group supports sub-filter coefficient sets $\underline{h}^k$, where k=0, 2, . . . , $2*\lfloor\{\lceil N/2\rceil-1\}/2\rfloor$ and the odd group supports filter coefficient sets $\underline{h}^k$, where k=0, 1, 3, . . . , $2*\lceil\{\lceil N/2\rceil-1\}/2\rceil-1$.

As a result, the re-sampler 900 reduces the circuit area by an additional 40%. That enables support for multiple re-sampler ratios such as M/N=8/9, 4/5, and 2/3, while reducing power consumption. Other re-samplers, for instance the re-samplers described in Balakrishnan, may also implement even group MC-CSD multipliers and odd group MC-CSD multipliers.

Figure 10:
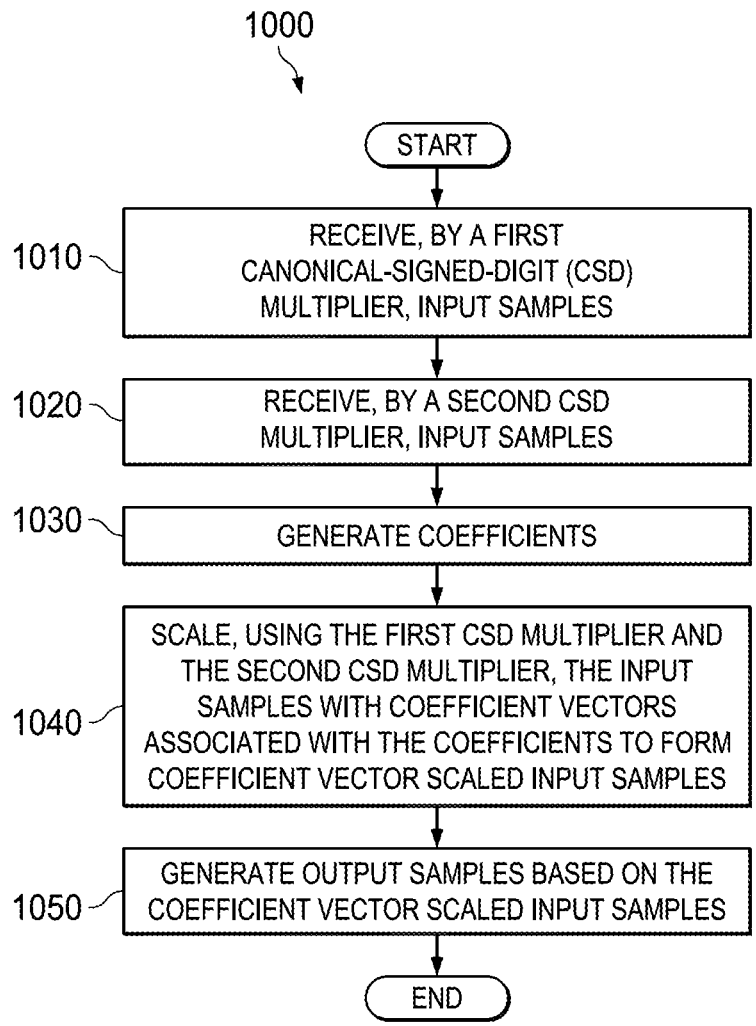
FIG. 10 is a flowchart illustrating a method of re-sampling according to an embodiment of the disclosure.

FIG. 10 is a flowchart illustrating a method 1000 of re-sampling according to an embodiment of the disclosure. The re-samplers 500, 700, 900 may implement the method 1000. At step 1010, a first CSD multiplier receives input samples. For instance, one of the CSD multipliers 510, 710, 920, 930 receives input samples x(m), x(m+1), . . . . At step 1020, a second CSD multiplier receives the input samples. For instance, another one of the CSD multipliers 510, 710, 920, 930 receives the input samples x(m), x(m+1), . . . . The first CSD multiplier and the second CSD multiplier may be MC-CSD multipliers. At step 1030, coefficients are generated. At step 1040, using the first CSD multiplier and the second CSD multiplier, the input samples are scaled with coefficient vectors associated with the coefficients to form coefficient vector scaled input samples. For instance, one of the CSD multipliers 510, 710, 920, 930 and another one of the CSD multipliers 510, 710, 920, 930 scales input samples with coefficient vectors $h^0$ through $h^8$ as shown in the tables 600. Finally, at step 1050, output samples are generated based on the coefficient vector scaled input samples. For instance, the output flip-flop 550 generates the output samples y(n), y(n+1), . . . .

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus comprising:
    a first canonical-signed-digit (CSD) multiplexer having an input and an output;
    a first accumulator having an input and an output, the input of the first accumulator is coupled to the output of the first CSD multiplexer;
    a second CSD multiplexer having an input and an output;
    a second accumulator having an input and an output, the input of the second accumulator is coupled to the output of the second CSD multiplexer; and
    a multiplexer having a first input, a second input, and an output, the first input of the multiplexer is coupled to the output of the first accumulator, and the second input of the multiplexer is coupled to the output of the second accumulator.

2. The apparatus of claim 1, further comprising:
    a first flip-flop having an input coupled to the first CSD multiplexer; and
    a second flip-flop having an input coupled to the second CSD multiplexer.

3. The apparatus of claim 1, wherein the multiplexer is a first multiplexer and further comprising:
    a second multiplexer having a first input,
        the first input of the second multiplexer is coupled to the output of the first accumulator.

4. The apparatus of claim 3, further comprising:
    a third flip-flop having an input and an output, the input of the third flip-flop is coupled to the first multiplexer, and the output of the third flip-flop is coupled to input of the first accumulator; and
    a fourth flip-flop having an input and an output, the input of the fourth flip-flop is coupled to the second multiplexer, and the output of the third flip-flop is coupled to input of the second accumulator.

5. The apparatus of claim 4, further comprising an output flip-flop having an input and an output, the input of the output flip-flop is coupled to the second accumulator.

6. The apparatus of claim 4, wherein the first CSD multiplexer, the first accumulator, the first multiplexer, the third flip-flop, the second CSD multiplexer, the second accumulator, the second multiplexer, and the fourth flip-flop are configured to operate at an input clock rate.

7. The apparatus of claim 1, wherein the apparatus is a digital M/N apparatus, wherein M is an up-sampling rate, and wherein N is a down-sampling rate.

8. The apparatus of claim 7, wherein the first CSD multiplexer and the second CSD multiplexer are multi-coefficient CSD (MC-CSD) multiplexers, and wherein the first CSD multiplexer and the second CSD multiplexer are configured to scale the input samples with N coefficients.

9. The apparatus of claim 1, wherein the apparatus is configured to clock gate and data gate portions of the first CSD multiplexer and the second CSD multiplexer.

10. An apparatus comprising:
a first multi-coefficient canonical-signed-digit (MC-CSD) multiplexer having an input and an output;
a second MC-CSD multiplexer having an input and an output; and
a commutator having a first input, a second input, and an output, the first input of the commutator is coupled to the first MC-CSD multiplexer, and the second input of the commutator is coupled to the second MC-CSD multiplexer.

11. The apparatus of claim 10, wherein the commutator is configured to:
receive coefficient vector scaled input samples from the first MC-CSD multiplexer and the second MC-CSD multiplexer;
receive a flip select signal.

12. The apparatus of claim 10, wherein the apparatus is a digital M/N apparatus, wherein M is an up-sampling rate, and wherein N is a down-sampling rate.

13. The apparatus of claim 12, wherein the first MC-CSD multiplexer and the second MC-CSD multiplexer support about N/2 coefficients.

14. A apparatus comprising:
an input commutator having an input and an output;
a first multi-coefficient canonical-signed-digit (MC-CSD) multiplexer having an input and an output, the input of the first MC-CSD multiplexer is coupled to the output of the input commutator;
a first intermediate commutator having an input and an output, the input of the first intermediate commutator is coupled to the output of the first MC-CSD multiplexer;
a second MC-CSD multiplexer having an input and an output, the input of the second MC-CSD multiplexer is coupled to the output of the input commutator;
a second intermediate commutator having an input and an output, the input of the second intermediate commutator is coupled to the output of the second MC-CSD multiplexer; and
an output commutator having a first input, a second input, and an output, the first input of the output commutator coupled to the first intermediate commutator, and the second input of the output commutator is coupled to the output of the second intermediate commutator.

15. The apparatus of claim 14, wherein the apparatus is a digital M/N apparatus, wherein M is an up-sampling rate, and wherein N is a down-sampling rate.

16. The apparatus of claim 15, wherein the input commutator is configured to:
receive select signals;
flip or not flip the input samples based on the select signals.

17. The apparatus of claim 14, wherein the first CSD multiplexer is configured to support first sub-filter sets $h^k$, wherein k=0, 2, ..., $2*\lfloor\{\lceil N/2 \rceil -1\}/2\rfloor$, wherein $\lfloor\ \rfloor$ is a floor operation that computes a nearest integer that is less than its operand, and wherein $\lceil\ \rceil$ is a ceiling operation that computes a nearest integer that is greater than its operand.

18. The apparatus of claim 17, wherein the second CSD multiplexer is configured to support second sub-filter sets $h^k$, and wherein k=0, 1, 3, ..., $2*\lceil\{\lceil N/2 \rceil -1\}/2\rceil -1$.

19. The apparatus of claim 18, wherein the first intermediate commutator and the second intermediate commutator are configured to:
receive flip select signals; and
flip or not flip coefficient vector scaled input samples based on the flip select signals.

20. The apparatus of claim 14, wherein the first MC-CSD multiplexer is configured to scale input samples x(m+2k) and the second MC-CSD multiplexer is configured to scale input samples x(m+2k+1) when the input commutator and the output commutator receive a first select signal.

21. The apparatus of claim 14, wherein the first MC-CSD multiplexer is configured to scale input samples x(m+2k+1) and the second MC-CSD multiplexer is configured to scale input samples x(m+2k) when the input commutator and the output commutator receive a second select signal.

22. A method comprising:
receiving, by a first multi-coefficient canonical-signed-digit (MC-CSD) multiplexer, input samples;
receiving, by a second MC-CSD multiplexer, the input samples;
generating coefficients;
scaling, using the first MC-CSD multiplexer and the second MC-CSD multiplexer, the input samples with coefficient vectors associated with the generated coefficients to form coefficient vector scaled input samples; and
generating output samples based on the coefficient vector scaled input samples.

23. The method of claim 22, further comprising:
clock gating portions of components corresponding to unused coefficients; and
data gating the portions corresponding to the unused coefficients.

24. The method of claim 23, further comprising:
receiving, by a commutator, the coefficient vector scaled input samples;
determining, by the commutator, to flip or not flip the coefficient vector scaled input samples.

* * * * *